Aug. 27, 1935.     C. A. CHRISTENSEN     2,012,258
BRAKING SYSTEM FOR VEHICLES
Filed Dec. 24, 1931
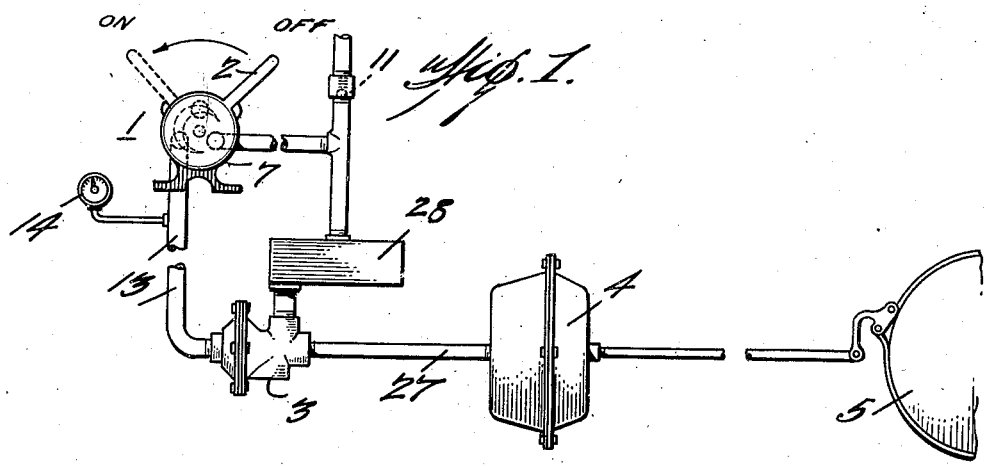
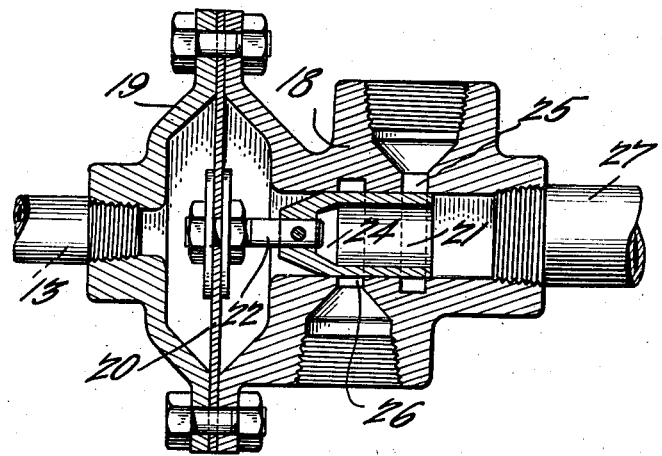
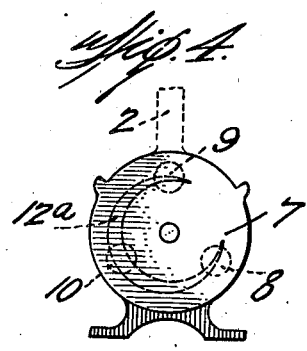
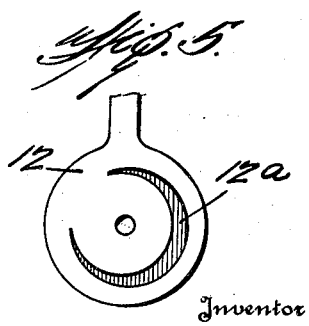
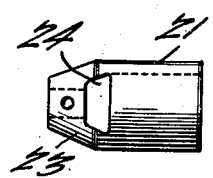
Inventor
Clarence A. Christensen
By Lee B. Kemon
his Attorney Patented Aug. 27, 1935

2,012,258

UNITED STATES PATENT OFFICE 2,012,258

BRAKING SYSTEM FOR VEHICLES

Clarence A. Christensen, San Francisco, Calif., assignor to William J. Besler, Plainfield, N. J.

Application December 24, 1931, Serial No. 583,107

6 Claims. (Cl. 303—26)

This invention relates to braking systems and apparatus of the servo-motor type for vehicles and the like, and particularly to systems and apparatus adapted for use in connection with the brakes on truck trailers, for example, in which a control valve upon the truck is arranged to control the brakes on the trailer through the instrumentality of a relay valve on the trailer operatively connected to the first mentioned valve.

In braking systems for truck trailers and other installations where the servo-motor is relatively far removed from the operator's position, a relay valve adjacent the servo-motor is employed to obviate the time delay encountered where the servo-motor is directly controlled by the control valve at the operator's position. In such systems, the main control valve is operative to control the relay valve, which in turn effects rapid and accurate energization and release of the servo-motor.

The relay valve may be controlled by the main control valve, for example, by means of a fluid-pressure connection between said valves, so that the adjustment of the relay valve and the corresponding operation of the servo-motor is dependent upon the pressure of the fluid in said connection. In systems of this character, difficulty is encountered in obtaining a desired partial application and release of the brakes, and the operator should have means for determining accurately the extent to which the brake mechanism is energized.

In accordance with the present invention, means is provided whereby the operator may readily effect the desired adjustment of the braking mechanism and, if desired, a gage or indicator may be provided adjacent the operator's position which is arranged to show the operating conditions that obtain.

In accordance with a further feature of the invention, the operator is provided with adjustable controlling means, the adjustment of which corresponds to the extent of application of the brakes. The controlling means, in the preferred embodiment of the invention, comprises an adjustable valve member movable between "off" and "on" positions and provided with a restricted bypass or bleeding passage so arranged that the pressure in the fluid connection extending to the relay valve varies in substantially direct ratio to the extent of movement of said valve member. Since the pressure applied to the relay valve determines the degree of energization of the servo-motor brakes, the latter corresponds to the adjustment of the movable valve member.

Other objects and advantages of the invention will appear from the following description of the embodiment thereof shown on the accompanying drawing, wherein:

Fig. 1 is a diagrammatic view of the system, including main control valve, relay valve, servo-motor and brake;

Fig. 2 is a detail view of the relay valve, the casing, diaphragm and valve piston being shown in section with the diaphragm and piston in their normal or balanced positions in which the valve ports are closed;

Fig. 3 is a detail view of the piston of the relay valve;

Fig. 4 is an elevational view of the valve body of the main control valve with top movable member groove dotted in position; and Fig. 5 is a fragmentary view of the top movable member of the main control valve.

The braking system shown by way of example in the drawing comprises a main control valve 1 provided with an operating handle 2 and arranged to control a relay valve 3. The control valve 1 may be arranged adjacent the operator's position upon a truck, for example, while the remote relay valve 3 may be disposed upon a trailer adjacent a reservoir 28 and a fluid-pressure motor 4 controlled by the valve 3 and arranged to apply and release the brake 5 on said trailer.

The valve 1 comprises a body portion 7 provided with angularly disposed ports 8, 9 and 10, the port 8 being connected preferably through a check valve 11 and, if desired, a suitable reservoir to a source of reduced pressure, such as the intake manifold of the engine. The ports 9 and 10 are connected to atmosphere and to the relay valve 3, respectively. A movable valve member 12 controlled by the handle 2 is arranged upon the body portion 7 and is provided with a passage or groove 12a arranged to cooperate with the port openings 8, 9 and 10, and to interconnect the port 10 with the port 8 or the port 9, or both in varying degrees, as desired. The port 10 is connected to the relay valve 3 by means of the fluid-pressure connection 13 extending between the truck and the trailer.

The operation of the system is dependent upon the pressure in the fluid-pressure connection 13 as will be apparent from the following description of the relay valve 3. A pressure gauge 14 connected to the connection 13 may be arranged adjacent the main control valve 1 to apprise the operator of the degree of energization of the brakes 5 upon the trailer.

Any suitable form of relay valve 3 which is responsive to pressure and operative to control the servo-motor 4 may be employed. One form of valve which may be utilized is shown in detail in Fig. 2 and comprises a hollow casing 18, one end of which is closed by a cap member 19. A flexible diaphragm 20 is clamped by the portions 18 and 19 of the casing and the cap member 19 is threaded or otherwise adapted to receive the pipe connection 13 to place the same in communication with one side of the diaphragm 20. The diaphragm is arranged to control the position of the movable valve member 21, for example in the form of a piston arranged to slide in the hollow casing 18. The piston 21 is flexibly connected as indicated at 22 to the diaphragm 20.

As shown in Fig. 3, the valve member 21 has a reduced end portion 23 with openings 24 therein to provide communication between the inner side of the diaphragm 20 and the interior of the valve member 21. The casing 18 is provided with port openings 25 and 26 arranged to cooperate with the valve member 21, whereby the pipe connection 27 will be connected either to the port 25 and reservoir 28 or the port 26 open to the atmosphere, depending upon the position of the valve member 21. It will be apparent that the position of the valve member 21 and consequently the pressure in the connection 27 leading to the servo-motor 4 depends upon the relative pressures existing at any time upon opposite sides of the diaphragm 20. The pressures upon the opposite sides of the diaphragm are only equal when the pressures in the pipe connections 13 and 27 are equal, and if a change in the connection 13 is effected, the valve member 21 moves in such a direction as to equalize the pressure in the connection 27. The port opening 25, being connected to a suitable source of reduced pressure, controls the application of the brakes whereas the port opening 26 is open to the atmosphere and controls the release of the brakes.

As shown in Figs. 4 and 5, the valve member 12 of the main control valve 1 is provided with a passage or groove 12a of such shape that upon the controlling movement of the valve member 12 the pressure in the fluid-pressure connection 13 is only reduced substantially in proportion to the extent of such movement, instead of being suddenly lowered to a minimum value when communication is established with the suction intake port 8.

It is obvious from the construction of the movable valve member 12 that in the "on" position, the port 10 is connected to port 8 and port 9 is blanked off and brakes will be full on. Similarly in the "off" position, the port 10 is connected to port 9, the port 8 is blanked off and brakes will be full off. In intermediate positions, the port 10 is connected to both ports 8 and 9, and the resultant reduced pressure in line 13 will depend upon the difference between the rate at which air is drawn out of groove 12a and supplied to groove 12a and the brakes will be applied in proportion to the reduction. Moving the operating handle in the "on" direction will increase the orifice produced by the groove 12a and port 8 and decrease the orifice produced between the groove 12a and port 9 thus lowering the pressure in the line 13 and producing greater braking effort. Moving the control handle in the "off" direction will produce the opposite result and decrease the braking effort.

In this manner, the pressure of the fluid in the connection 13 may be accurately and readily controlled in accordance with the position of the handle 2, thereby effecting a similar partial energization or release of servo-motor 4 as above described. In addition, the gauge 14 indicates to the operator the pressure variation in the controlling system which is a measure of the degree of energization of the brakes on the trailer.

Various modifications of the structure shown and described herein will occur to those skilled in the art and are intended to come within the scope of the present invention if within the terms of the appended claims.

I claim:
1. In a braking system for a vehicle comprising a servo-motor brake, a relay valve for controlling the same, and fluid-pressure means for controlling said relay valve; a main valve associated with said fluid-pressure means being provided with relatively movable valve members, one of said members having ports and another of said members having a restricted passage to register to a variable extent with said ports to effect a gradual variation of pressure upon the relay valve determined by the extent of relative movement of said valve members.

2. In a braking system for a vehicle comprising a servo-motor brake, a relay valve for energizing said servo-motor brake to an extent depending upon the adjustment of said valve, and a fluid-pressure connection to said relay valve; a main control valve associated with said fluid-pressure connection and embodying a movable valve member having an elongated groove formed therein of varying cross-section, and means cooperating with said groove whereby the pressure in said fluid-pressure connection varies in substantially direct ratio to the extent of movement of said movable valve member to effect a brake application corresponding to the adjustment thereof.

3. In a braking system for a vehicle comprising a servo-motor brake, a relay valve for controlling the same, and fluid-pressure means for controlling said relay valve; a main valve associated with said fluid-pressure means being provided with ports and a movable valve member having a restricted passage arranged to register a variable extent with said ports to effect a gradual variation of pressure upon the relay valve determined by the extent of movement of said movable valve member.

4. In a braking system for a vehicle comprising a servo-motor brake, a source of fluid pressure for operating the same, a relay valve controlling the connection between said source and the servo-motor brake and fluid-pressure means including a main control valve for controlling said relay valve, said main control valve embodying a casing provided with three spaced ports leading to said source of fluid pressure, to atmosphere and to said relay valve, respectively, and a movable valve member arranged to connect all of said ports simultaneously and in other positions to connect said relay valve port to the other ports individually.

5. In a braking system for a vehicle comprising a source of fluid pressure, a servo-motor brake, a relay valve for controlling the same and fluid-pressure means including a main valve for controlling said relay valve, said main valve being provided with a movable valve member adapted to connect said relay valve simultaneously to atmosphere and to said source of fluid pressure through variable orifices.

6. In a braking system for a vehicle comprising a servo-motor brake, and a relay valve for controlling the same; a movable member having a fluid passage formed therein of varying cross-section, and fluid pressure connections cooperating with the said passage of said member and said relay valve whereby the latter will function in substantially direct ratio to the extent of movement of said movable member to effect a corresponding brake application.

CLARENCE A. CHRISTENSEN.